United States Patent [19]
Hayashi et al.

[11] Patent Number: 5,621,861
[45] Date of Patent: Apr. 15, 1997

[54] METHOD OF REDUCING AMOUNT OF DATA REQUIRED TO ACHIEVE NEURAL NETWORK LEARNING

[75] Inventors: Masaaki Hayashi; Takumi Takahashi, both of Yokohama, Japan

[73] Assignee: Matsushita Electric Industrial Co., Ltd., Osaka, Japan

[21] Appl. No.: 264,091

[22] Filed: Jun. 21, 1994

[30] Foreign Application Priority Data

Jul. 27, 1993 [JP] Japan ................................. 5-184792

[51] Int. Cl.⁶ .............................. G06E 1/00; G06E 3/00; G06F 15/17
[52] U.S. Cl. ................... 395/23; 395/20; 395/21
[58] Field of Search ................ 395/20–27; 382/155–159

[56] References Cited

U.S. PATENT DOCUMENTS

| | | | |
|---|---|---|---|
| 5,063,601 | 11/1991 | Hayduk ..................... | 395/24 |
| 5,067,164 | 11/1991 | Denker et al. ................. | 382/158 |
| 5,159,644 | 10/1992 | Martin et al. ................. | 382/14 |
| 5,283,838 | 2/1994 | Togawa et al. ............... | 382/14 |
| 5,311,600 | 5/1994 | Aghajan et al. ................ | 382/14 |
| 5,355,434 | 10/1994 | Yoneda et al. ................ | 395/23 |
| 5,408,588 | 4/1995 | Ulug .......................... | 395/23 |
| 5,469,530 | 11/1995 | Makram-Ebeid ............. | 395/23 |
| 5,479,576 | 12/1995 | Watanbe et al. .............. | 395/23 |

OTHER PUBLICATIONS

Gallant, Stephen I. "Neural Network Learning and Expert Systems," MIT Press. Mar. 1993.

Krause, Andreas and Heidi Hackbarth, "Scaly Artificial Neural Networks for Speaker–Independent Recognition of Isolated Words." ICASSP '89: Acoustics, Speech & Signal Processing Conference.

Thierer, Gebhard, Andreas Krauss, and Heidi Hackbarth, "Training Speed–Up Methods for Neural Networks Applied to Word Recognition," Neural Networks, 1991 IEEE Int'l. Conference.

*Primary Examiner*—Tariq R. Hafiz
*Attorney, Agent, or Firm*—Lowe, Price, LeBlanc & Becker

[57] ABSTRACT

A method of reducing the amount of learning data required to execute a neural network learning procedure, whereby an original entire set of learning sample data are divided, using cluster analysis of the original entire learning sample data, into a plurality of sub-groups, with the sub-groups being respectively applied to a neural network as learning data and with respective values of recognition index obtained thereby for the neural network being judged, to select the smallest sub-group which will provide a value of recognition index that is at least equal to the recognition index obtainable by using the original entire learning data.

11 Claims, 3 Drawing Sheets

FIG. 3

| ITERATION 0 | ENTIRE LEARNING DATA SIZE : 9480 PATTERNS<br><br>RECOGNITION INDEX FOR TEST DATA (2080 PATTERNS) : 93.80% | |
|---|---|---|
| ITERATION 1 | | CLUSTER DATA SIZE : 4740<br>RECOGNITION INDEX FOR TEST DATA :<br>SUB-GROUP $S_{11}$ : 95.24%<br>SUB-GROUP $S_{12}$ : 85.02% |
| ITERATION JUDGEMENT : | 93.80 < 95.24 | |
| ITERATION 2 | | CLUSTER DATA SIZE : 3160<br>RECOGNITION INDEX FOR TEST DATA :<br>SUB-GROUP $S_{21}$ : 93.85%<br>SUB-GROUP $S_{22}$ : 90.00%<br>SUB-GROUP $S_{23}$ : 76.06% |
| ITERATION JUDGEMENT : | 93.80 < 93.85 | |
| ITERATION 3 | | CLUSTER DATA SIZE : 2870<br>RECOGNITION INDEX FOR TEST DATA :<br>SUB-GROUP $S_{31}$ : 93.75%<br>SUB-GROUP $S_{32}$ : 93.08% |
| ITERATION JUDGEMENT : | 93.80 < 93.75 | |

FINALLY ESTABLISHED SUB-GROUP : $S_{21}$

METHOD OF REDUCING AMOUNT OF DATA REQUIRED TO ACHIEVE NEURAL NETWORK LEARNING

BACKGROUND OF THE INVENTION

Field of the Invention

The present invention relates to a method of reducing an amount of learning data which are required for use in a learning procedure applied to a neural network which is to perform pattern recognition.

When a neural network is to be used in pattern recognition applications, it is necessary to execute beforehand a learning procedure, for establishing suitable parameter values within the neural network. In the learning procedure, a set of sample patterns (referred to herein as the learning data), which have been selected in accordance with the patterns which are to be recognized, are successively inputted to the neural network. For each sample pattern there is a known appropriate output pattern, i.e. which should be produced from the network in response to that input pattern. The required known output patterns will be referred to as the teaching data. In the learning procedure, the learning data patterns are successively supplied to the neural network, and resultant output patterns produced from the neural network are compared with the corresponding teaching data patterns, to obtain respective amounts of recognition error. The internal parameters of the neural network are successively adjusted in accordance with these sequentially obtained amounts of error, using a suitable learning algorithm. These operations are repetitively executed for the set of learning data, until a predetermined degree of convergence towards a maximum degree of pattern recognition is achieved (i.e. the maximum that can be achieved by using that particular set of learning data). The degree of recognition can be measured as a recognition index, expressed as a percentage.

The greater the number of sample patterns constituting the learning data, the greater will be the invariant characteristic information that is learned by the neural network. Alternatively stated, a learning algorithm which is utilized in such a procedure (i.e. for adjusting the neural network internal parameters in accordance with the error amounts obtained during the learning procedure) attempts to achieve learning of a complete set of probability distributions of a statistical population, i.e. a statistical population which consists of arbitrary data, consisting of all of the possible patterns which the neural network will be required to recognize after learning has been achieved. That is to say, the learning algorithm performs a kind of pre-processing, prior to actual pattern recognition operation being started, whereby characteristics of the patterns that are to be recognized are extracted and applied to modify the internal parameters of the neural network.

In the prior art it has been necessary to utilize as large a number of sample data in the learning procedure as possible, in order to maximize the recognition index that is achieved for the neural network. However there are practical limitations on the number of sample patterns that can be stored in memory for use as learning data. Furthermore, such learning data may include data which will actually tend to lower the recognition index, if used in the learning procedure.

SUMMARY OF THE INVENTION

It is an objective of the present invention to overcome the problems of the prior art above, by providing an algorithm for reducing the amount of learning data necessary for a learning procedure applied to a neural network which is to perform pattern recognition.

It is a further objective of the invention to achieve that reduction of the learning data by extracting from an entire set of original learning data a sub-set of that data which, when used in a neural network learning procedure, will enable value of recognition index to be achieved that is greater than or equal to the value of recognition index which is achievable by using the entire set of original learning data.

Specifically, the invention achieves that objective by excluding from the learning data those data which will tend to lower the recognition index if used for the learning procedure, while retaining those data which will tend to increase the recognition index. That is done, basically, by first evaluating the recognition index that can be attained when the initial (entire) set of learning data are used in the neural network learning procedure, dividing that initial set of learning data into a plurality of sub-groups by using statistical analysis of the initial set of learning data to determine the respective contents of these sub-groups, then evaluating the respective recognition indexes that are attained when the respective sub-groups are used as the learning data in the learning procedure, to find a sub-group that is of the smallest possible size consistent with providing a value of recognition index that is at least equal to that obtained when using the initial entire set of learning data. Each of the sample patterns constituting the learning data corresponds to a set of n signal values (where n is a fixed integer) which are applied to respective units of the input layer of the neural network and which can be expressed as n respective numeric values. Thus each sample pattern corresponds to a specific vector defining a point within an n-dimensional metric space. The respective contents of the sub-groups are selected, considering the sub-groups as clusters within that metric space, by using one of various possible methods of cluster analysis, based on distances within that space.

Alternatively stated, the invention achieves the above objective by using an algorithm to derive a set of basis vectors, corresponding to respective sample patterns, within a probability distribution space, such that these sample patterns will enable a satisfactory value of recognition index to be achieved when used in a neural network learning procedure. That algorithm serves to infer the properties of the data population which constitutes the entire set of learning data, from a sub-set of that population.

In that way, by applying statistical analysis to derive sub-groups of the original entire set of learning data, and then evaluating the respective performances of these sub-groups when each is used as the learning data (or of one of the sub-groups, which can be anticipated to provide the highest value of recognition index of that set of sub-groups), the amount of the learning data that is finally utilized can be reduced, with no reduction of the neural network recognition index that is obtained, by comparison with the case in which the original entire set of learning data is utilized.

Specifically, the invention provides a method of reducing an amount of learning data required for executing a neural network learning procedure wherein successive learning data patterns each formed of a fixed number of values are supplied to a neural network having an input layer formed of an identical number of units to the fixed number. The method comprises selecting from an original set of learning sample data an optimum sub-group of learning sample data, which will provide a value of recognition index at least as high as a value of recognition index obtainable by using the original set of learning sample data. The selection of the optimum sub-group is based on judging respective values of recognition index achieved by successively using a plurality of sub-groups of the original learning sample data, the judgement being executed by utilizing an arbitrary set of test data extracted from the original learning sample data.

The sub-groups are preferably extracted from the original learning sample data by utilizing multiple variable analysis and topology of an n-dimensional metric space, where n is the fixed number.

More specifically, the invention provides a method of neural network learning data reduction for deriving, from an original set of learning sample data consisting of a plurality of sample patterns, a sub-group of the original set of learning sample data for use in a learning procedure for a neural network, each sample pattern comprising a set of n pattern component values where n is a fixed integer, the neural network having an input layer formed of n units respectively coupled to receive the component values, the method comprising steps of:

executing the learning procedure while supplying the original set of learning sample data to the input layer, and measuring a first value of recognition index that is obtained thereby;

dividing the original set of learning sample data into a plurality of respectively different sub-groups, having respective contents determined based on analyzing the original learning sample data by treating the sample pattern values thereof as respective points in an n-dimensional metric space; and deriving and judging respective values of recognition index obtained when the sub-groups are successively used as learning sample data in the learning procedure, to select one of the sub-groups which is of minimum size consistent with providing a value of recognition index that is at least equal to the first value of recognition index.

The respective contents of the sub-groups are preferably determined based on values of intra-cluster variance of clusters within an n-dimensional metric space, where the clusters respectively correspond to the sub-groups and the sample patterns define respective points in the metric space.

BRIEF DESCRIPTION OF THE DRAWINGS

FIG. 3 shows examples of results actually achieved during successive iterations of a loop in the flow diagram of FIG. 2.

DESCRIPTION OF PREFERRED EMBODIMENTS

Figure 1:
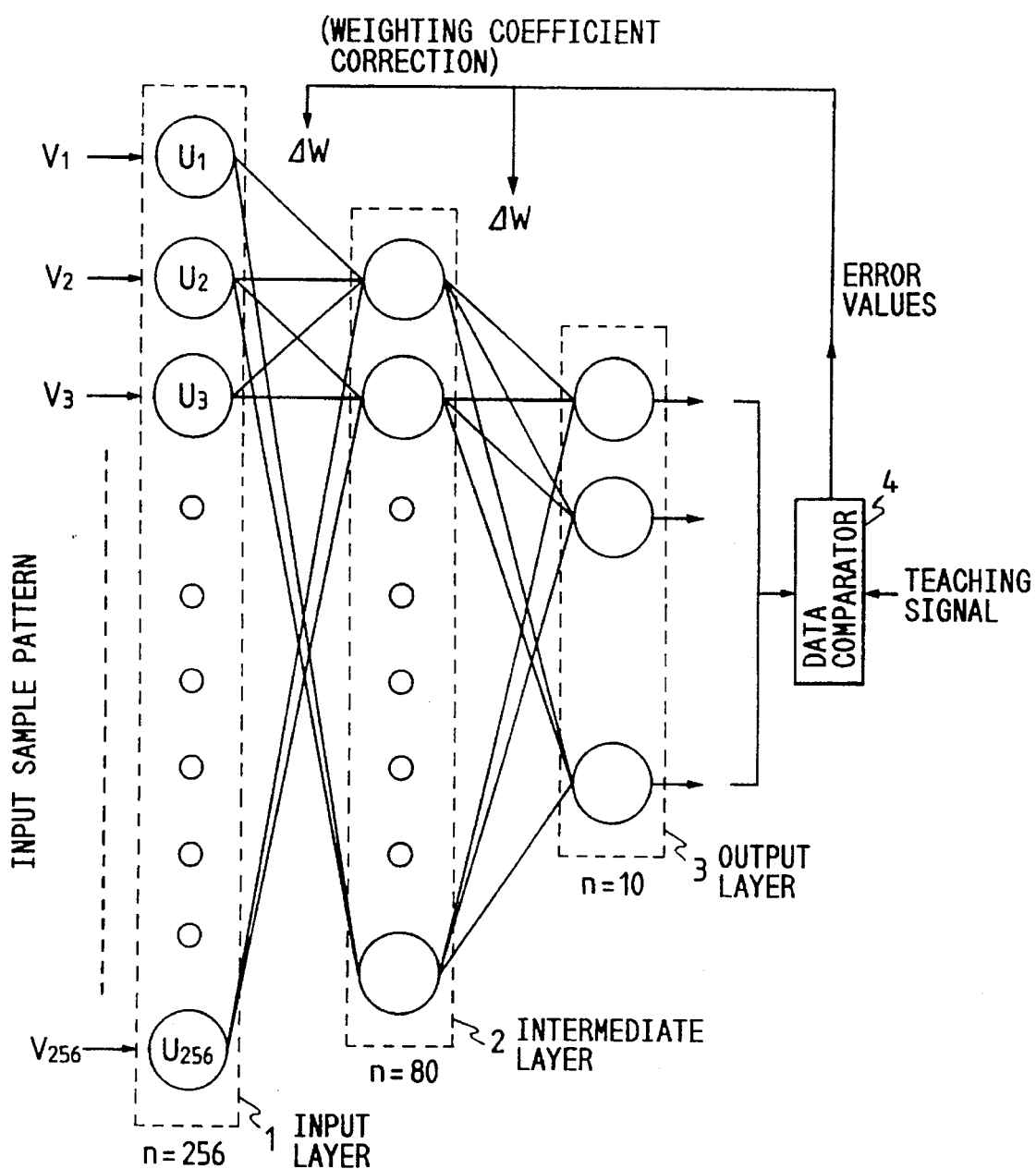
FIG. 1 is a conceptual block diagram of a neural network to which the present invention is applicable, for illustrating the basic principles of the learning procedure.

The basis of the present invention lies in applying multiple variable analysis and topology to the entire set of sample pattern data that are available as learning data for a neural network. Each learning datum consists of n values, where n is a fixed integer (equal to the number of units constituting the input layer of the neural network). It will be assumed that these n values constituting an input datum are numeric values so that multiple variable analysis and topology can be applied to the sample pattern data by treating each datum as a point within an n-dimensional metric space.

In practice, the n values constituting a learning datum might be analog signal values, in which case analog-to-digital conversion to obtain corresponding numeric values would be necessary The concept of distance within an n-dimensional metric space, as used with the present invention, will first be explained. In general, a real numeric function can be defined for a set of data X, as follows:

$$d: X^2 \to \mathbb{R} \quad [1]$$

If the following set of relationships [2] are satisfied, then $<<X ; d>>$ is called a metric space:

$$d(x, y) \geq 0,$$
$$d(x, y) = 0 \Leftrightarrow x = y, \quad [2]$$
$$d(x, y) = d(y, x)$$
$$d(x, y) + d(x, z) \geq d(x, z)$$

d is referred to as the distance function in X, and d(x, y) is called the distance between the two points x and y. If a population P is divided into n sub-groups $(S_1, S_2, \ldots, S_n)$, then the sub-groups are referred to as clusters. The process of inferring the population P from the clusters is called cluster sampling. The distances between points (i.e. points defined by sample vectors within the metric space) is determined by the distance between the clusters. It is possible to use the Euclidean distance, or the Mahalanobis distance (respectively defined hereinafter) as the distances between clusters, or to obtain the distance based on a relatedness property such as a variation coefficient, correlation ratio, etc.

The distance between two points $x=(x_i), y=(y_i)$ in an n-dimensional real numeric space $\mathbb{R}^n$ is defined as:

$$d_p(x, y) = \left[ \sum_{i=1}^{n} |x_i - y_i|^p \right]^{1/p} \quad [3]$$

In the above, $1 \leq p \leq \infty$
Also, in particular, $$d_1(x, y) = \sum_{i=1}^{n} |x_i - y_i| \quad [4y]$$

A distance in Euclidean space is defined as:

$$d_2(x, y) = \sqrt{\sum_{i=1}^{n} (x_i - y_i)^2} \quad [5]$$

If:

$$d_\infty(x, y) = \max_{1 \leq i \leq n} |x_i - y_i| \quad [6]$$

then $<<\mathbb{R}^n; d_2>>$ is called an n-dimensional Euclidean space.

The following is also true:

$$D_k^2 = (x_k - \bar{x}) S^{-1} (x_k - \bar{x})^t \quad [7]$$

In the above, the k-th sample vector in the n-dimensional space is expressed as $$x = (x_{1k}, x_{2k}, \ldots, x_{nk}).$$

$S^{-1}$ is the inverse matrix of the variance covariance matrix. $D_k$ is the distance between the centroid of the entire set of sample data and the k-th sample vector, and is called the Mahalanobis distance.

Inter-cluster variance and intra-cluster variance can be obtained on the basis of the above Euclidean or Mahalanobis distance values. Thus, the inter-cluster variance can be defined as:

$$\sigma_b^2 = \sum_{j=1}^{n} N_j (\bar{x}_j - \bar{x})^2 \qquad [8]$$

And the intra-cluster variance defined as $$\sigma_w^2 = \sum_{j=1}^{M} \sum_{K=1}^{N_j} (x_{jk} - \bar{x}_j)^2 \qquad [9]$$

Here, M is the number of clusters, N is the number of elements constituting each cluster.

Another possible way of defining cluster distances is based on the following equations [10] to [13]. Designating the mean value and the variance of a population as $\bar{x}$ and $\sigma^2$ respectively, the variance is expressed as:

$$\sigma^2 = \sigma_b^2 + \sigma_w^2 \qquad [10]$$

The inter-cluster variation coefficient can be expressed as:

$$C_b = \sigma_b/\bar{x} \qquad [11]$$

And the intra-cluster variation coefficient expressed as:

$$C_w = \sigma_w/\bar{x} \qquad [12]$$

Designating the variation coefficient of the population as C, the following is true:

$$C = C_b^2 + C_w^2 \qquad [13]$$

Considering the relationship between the neural network recognition index and the amount of data used as learning data, if the learning data amount were to simply be reduced, then the resultant value of recognition index that is achieved would be lowered. However if a sub-set of the entire set of learning data is extracted, while ensuring the necessary number of basis vectors within the stochastic distribution space of the entire set of learning data (i.e. the necessary number of basis vectors within a deterministic invariant characteristic space) are contained within that sub-set, then the recognition index that is achieved by using such a reduced amount of learning data can in fact be increased, by comparison with the recognition index that is achievable by using the entire set of learning data.

FIG. 1 is a conceptual block diagram showing an example of a neural network to which the present invention is applicable, and an embodiment of the invention will be described in relation to that neural network example. This is preferably a back propogation type of neural network, since such a network provides the most effective learning operation. The neural network of FIG. 1 is made up of an input layer 1, which is assumed to consist of 256 units, designated as $U_1$ to $U_{256}$ respectively, an intermediate layer 2 made up of 80 units, and an output layer 3 made up of 10 units.

The three layers of the neural network are mutually interconnected as shown, with signals flowing through the input layer, intermediate layer and output layer sequentially, in response to an input sample pattern supplied to the input layer during pattern recognition operation (i.e. forward propagation). The term "sample pattern" as used herein signifies a set of signal values, identical in number to the number of units constituting the neural network input layer, which are supplied to respective ones of these units. These signal values of an input sample pattern will be referred to as the pattern component values, which are designated as $V_1$ to $V_{256}$ in FIG. 1, and are respectively supplied to units $U_1$ to $U_{256}$ of the input layer 1. The pattern component values may be supplied to the input layer in analog signal form, however in that case they are also converted to digital form, expressing respective numeric values, for the purpose of executing analysis in the n-dimensional metric space as described hereinabove, where n is equal to 256 in this example. That is to say, each input pattern represents a set of n real numbers, where n is the number of units of the neural network input layer, and so corresponds to a point within the n-dimensional metric space, with each sample pattern expresses a corresponding vector defining a point in that metric space.

Resultant output values produced from the input layer are multiplied by variable weighting coefficients before being supplied to the intermediate layer. The units constituting the intermediate layer and output layer are non-linear transducer elements, and the output values from the intermediate layer units are also multiplied by respective variable weighting coefficients before being supplied to the output layer.

It will be assumed that the neural network of this embodiment is to be utilized for recognizing sample patterns which represent handwritten numerals, and that the output layer 3 is made up of 10 units, producing output signals indicative of recognition of the numerals 0 to 9 respectively. During the learning procedure, each input sample pattern consists of a set of 256 actually invariant values representing a handwritten numeral, e.g. values originally obtained from an optical scanner (not shown in the drawings).

The neural network is shown in FIG. 1 as being set in a condition in which learning is being executed. Each time that a sample pattern from the learning data is applied to the input layer 1, the resultant output pattern from the output layer 3 is compared with a specific teaching pattern in a comparator 4, with that teaching pattern being part of a data stream designated as the teaching signal. The difference between that teaching pattern and the output pattern from the output layer 3 is produced from the comparator 4 as an error signal. Corresponding amounts of correction for the weighting coefficients of the neural network are then calculated (using one of various possible known algorithms) and applied to modify the weighting coefficient values in the network. That process is successively repeated for each of the sample patterns constituting the set of learning data, and is cyclically repeated for the set of learning data, until learning convergence is reached.

Backward propagation operation is utilized in adjusting the weighting coefficients. That is to say (assuming only a single intermediate layer, as in the example of FIG. 1), the weighting coefficients of the connections between the intermediate layer 2 and the output layer 3 are first adjusted, then the weighting coefficients of the connections between the input layer 1 and the intermediate layer 2. Since such neural network learning operation is now well known in the art, detailed description will be omitted.

The operation of this embodiment of the method of the present invention will be described referring to the flow diagram of FIG. 2. An entire set of learning data consisting of 9480 sample patterns is provided, that set being designated as $S_0$, and a set of 2080 sample patterns is provided for use as test data, to evaluate the recognition index that has been achieved by a learning procedure. In step 10 of FIG. 2, neural network learning is executed using the entire set $S_0$ of 9480 sample patterns, until learning convergence is reached. The neural network recognition index $R_0$ that has thereby been attained is then measured, using the test data, in step 11.

In step 12, the entire learning data set $S_0$ are then divided into two sub-groups, i.e. clusters, by using cluster analysis, in accordance with distances of sample patterns from the centroid of the $S_0$ population. That is to say, $S_0$ is divided into two clusters, one of which has a higher value of intra-cluster variance than the other. In step 13 the test data are used to find the respective values of recognition index that are obtained when each of these two sub-groups are used as the learning data. In step 14, a judgement is made as to whether either of these two values of recognition index is greater than the value $R_0$ that was obtained in step 11. If either of the values of recognition index obtained in step 13 is greater than or equal to $R_0$, then operation proceeds to step 12, and the loop of steps 12 to 14 is repeated, but with the sample data set $S_0$ being divided into 3 sub-groups in this iteration.

It can thus be understood that at each iteration of steps 12 to 14, if it is detected in step 14 that none of the sub-groups established in that iteration (when used as learning data) provides a value of recognition index that is higher than or equal to the value of recognition index attained using the original complete set of learning data, then a sub-group established in the preceding iteration, which provided a value of recognition index at least equal to that attainable with the original entire set of learning data, is selected as the finally obtained set of learning data.

In the above it has been assumed that at each execution of step 13, the respective values of recognition index obtained for each of the clusters established in step 12 are derived, and are evaluated in step 14. However in practice it may be possible to obtain the recognition index value for only one of these clusters, i.e. a cluster which can be anticipated to provide the highest value of recognition index out of all of that set of clusters. Hence, it may only be necessary to evaluate, in each execution of steps 13, 14, one out of each of the sets of clusters that are generated in step 12. For that reason, step 14 should be understood as being a step in which the recognition index value $R_n$ is compared with the recognition index $R_0$ obtained for the original entire set of learning data, where $R_n$ is the recognition index achieved by using the cluster (of the current set) that provides the highest value of index of all of the clusters of that set.

In the following, execution of the initial steps 10, 11 of FIG. 2 will be referred to as iteration 0, with the first and subsequent executions of steps 12 to 14 being referred to as iterations 1, 2, etc. Thus, the entire sample data set $S_0$ is divided into successive pluralities of sub-groups in successive interations. That is, $S_0$ is divided into two sub-groups in iteration 1, three sub-groups in iteration 2, and so on. In general, using the suffix n to indicate the number of an iteration, the division of the data into a set of m sub-groups can be expressed as follows:

$$S_{n-1} = S_{n1} + S_{n2} + \ldots + S_{nm} \quad [14]$$

With the size of each of these sub-groups, e.g. of $S_{nm}$, being obtained as:

(Size of $S_{n-1}$)/m

The contents of the respective sub-groups are selected based on the following relationship:

$$\sigma_w(S_{n1}) > \sigma_w(S_{n2}) \ldots > \sigma_w(S_{nm}) \quad [15]$$

Thus, for the case of r=1, the following are obtained:

$$\sigma_w(S_{11}) > \sigma_w(S_{12})$$

$$S_0 = S_1 + S_2$$

That is to say, as shown by relationship [15], each set of sub-groups is derived from the original entire learning data $S_0$ as a set of clusters having respectively different values of square root of intra-cluster variance, in accordance with relationship [15] above, while the sub-groups of the set are formed of respectively identical numbers of sample patterns. That is to say, the contents of the sub-groups are determined based on statistical analysis of the entire original set of sample patterns, considered as points within an n-dimensional numeric space, where n is the number of component values constituting each sample pattern, i.e. the number of units constituting the input layer of the neural network.

Figure 2:
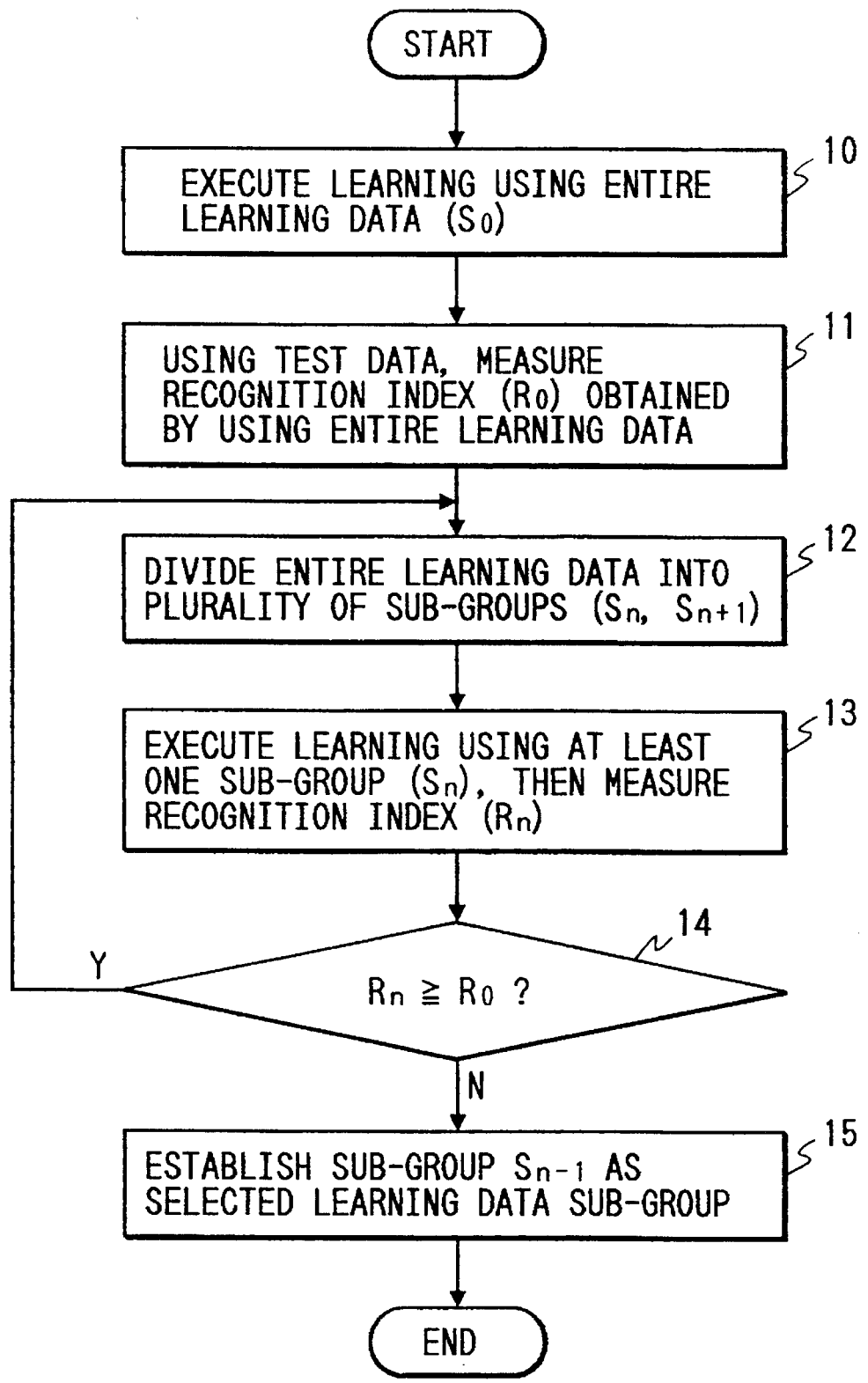
FIG. 2 is a flow diagram of an embodiment of the present invention.

The operation shown in FIG. 2 can be readily understood by referring to the practical example illustrated in FIG. 3. As stated above, the entire original set of learning data $S_0$ consists of 9480 sample patterns, and 2080 sample patterns are provided as test data. In iteration 0 it is found that the recognition index $R_0$, obtained when the entire set of learning data $S_0$ is used in the learning procedure, is 93.80%. In iteration 1, the learning data $S_0$ sample set is divided into two sub-groups ($S_{11}$ and $S_{12}$) each consisting of 4740 sample patterns, with the respective contents of the sub-groups being determined in accordance with relationship [15] above, and it is found that a recognition index of 95.24% is achieved when the sub-group $S_{11}$ is used in the learning procedure. Since a 'yes' decision is thereby reached in step 14 of FIG. 2, iteration 2 is then performed, in which the learning data set $S_0$ is divided into three sub-groups, i.e. with the size of each sub-group being 3160 sample patterns. It is found that when one of these sub-groups ($S_{21}$) is used as the learning data in the neural network learning procedure, a value of recognition index is attained which is higher than the recognition index $R_0$, and so iteration 3 is then executed. In this iteration, the learning data $S_0$ is divided into four sub-groups each having a size of 2370 sample patterns, however only the recognition index results obtained for two of these (i.e. the two highest recognition index values obtained for the four sub-groups) are shown in FIG. 3. In this case, none of the values of recognition index obtained for the four sub-groups is higher than $R_0$, and so operation proceeds to step 15 of FIG. 2, in which the sub-group $S_{21}$ established in the previous iteration is selected as the finally obtained set of learning data.

Thus from the above embodiment, it can be understood that the invention enables a sub-group of the entire initial set of learning data to be selected, which, when used as the neural network learning data, will enable a value of recognition index to be achieved that is equal to or greater than that achievable by using the entire initial set of learning data. It is therefore clear that the invention effectively achieves the objectives of enabling the amount of data which must be used as neural network learning data to be substantially reduced (from 9480 to 3160 sample patterns in the above example) without reduction of the recognition index that is obtained by using the reduced amount of learning data in a learning procedure.

It will be clear from the above example that with the method of the present invention, an algorithm is utilized whereby the entire initial set of learning data ($S_0$) is successively divided into increasing numbers of sub-groups, of successively reduced size, until a sub-group is found which is of the smallest possible size consistent with providing a value of recognition index (when the sub-group is used as the neural network learning data) which is equal to or greater than the recognition index value attained when the entire set of learning data ($S_0$) is utilized in the learning procedure.

It will be understood that it would be equally possible to use other algorithms that that shown in FIGS. 2, 3, to achieve similar results.

Thus by using the method of the present invention, the amount of data which must be used as neural network learning data can be substantially reduced, thereby reducing the memory capacity required to store that data, with no lowering of the value of neural network recognition index that is achieved.

Although in the above embodiment the contents of the sub-groups are selected based on differences in values of intra-cluster variance, it would also be possible to perform that selection on the basis of some other method of cluster analysis based on distance relationships of points corresponding to the sample patterns within an n-dimensional metric space.

Moreover, various ways of determining the distance relationships are possible, such as utilizing the Euclidean and Mahalanobis distances described above. The type of distance relationships used should be selected by the designer based on factors such as the patterns that are to be recognized, the configuration of the neural network, the size of the original set of learning pattern data, etc.

Thus, although the invention has been described with reference to a specific embodiment, it should be understood that the invention is not limited to the contents of that embodiment, and that various modifications could be envisaged which fall within the scope of the appended claims.

What is claimed is:

1. A method of reducing an amount of data used in a neural network learning procedure by deriving, from an original set of learning sample data ($S_0$) consisting of a plurality of sample patterns, a sub-group of said original set of learning sample data for use in the learning procedure for a neural network, each sample pattern in said original set and in said sub-group comprising a set of n pattern component values where n is a fixed integer, said neural network having an input layer formed of n units respectively coupled to receive said component values, said method comprising the steps of:

executing said learning procedure by supplying said original set of learning sample data to said input layer of said neural network, and measuring a first value of recognition index ($R_0$) that is obtained by the neural network;

dividing said original set of learning sample data into a plurality of respectively different sub-groups, said sub-groups having respective contents determined from analysis of distance relationships among said original learning sample data ($S_0$) by treating said sample pattern values of said original learning sampled data as respective points in an n-dimensional metric space; and deriving and judging respective values of recognition index obtained by using respective ones of said sub-groups as learning sample data in said learning procedure, and selecting from said sub-groups for use in the learning procedure one sub-group meeting a criterion of providing a value of recognition index that is at least equal to said first value of recognition index ($R_0$) and having a minimal size among sub-groups meeting that criterion.

2. A method of reducing an amount of data used in a neural network learning procedure according to claim 1 comprising the step of determining respective contents of the sub-groups in accordance with values of intra-cluster variance of clusters within the n-dimensional numeric space, said clusters respectively corresponding to said sub-groups and said sample patterns defining respective points in said n-dimensional numeric space.

3. A method of reducing an amount of data used in a neural network learning procedure according to claim 1, comprising the step of determining said respective contents of the subs-groups in accordance with values of an intra-cluster variation coefficient said sub-groups corresponding to respective clusters within said n-dimensional metric space.

4. A method of reducing an amount of data used in a neural network learning procedure according to claim 1, comprising the step of determining said steps of dividing said original learning sample data into a plurality of sub-groups and deriving and judging respective values of recognition index for said sub-groups and selecting one of said sub-groups comprise successive iterations of a set of steps of:

(a) dividing said original learning sample data into two sub-groups in a first of said iterations, and into a number of sub-groups that is incremented by one in each successive one of said iterations;

(b) sequentially using said sub-groups obtained in said step (a) in said learning procedure, and measuring restrictively corresponding values of recognition index obtained for said neural network;

(c) comparing said recognition index values obtained in said step (b) with said first value of recognition index ($R_0$) and, if any of said recognition values obtained for the sub-groups is at least equal to or greater than said first value of recognition index, executing another iteration, while if all of said respective recognition index values obtained in said step (b) are smaller than said first value of recognition index, selecting as a final learning sample data a sub-group which was defined in a preceding iteration and for which a corresponding value of recognition index was found to be at least equal to or greater than said first recognition index ($R_0$).

5. A method of reducing an amount of data used in a neural network learning procedure according to claim 1, comprising the step of determining said steps of dividing said original learning sample data into a plurality of sub-groups and deriving and judging respective values of recognition index for said sub-groups and selecting one of said sub-groups comprise successive iterations of a set of steps of:

(a) dividing said original learning sample data into two sub-groups in a first of said iterations, and into a number of sub-groups that is incremented by one in each successive of said iterations;

(b) using a predetermined one of a set of sub-groups obtained in said step (a) in said learning procedure, and measuring a corresponding value of recognition index obtained by said neural network;

(c) comparing said corresponding value of recognition index obtained in said step (b) with said first value of recognition index ($R_0$) and, if said corresponding recognition index value obtained in said step (b) is at least equal to or greater than said first value of recognition index, executing another iteration, while if said corresponding value of recognition index obtained in said step (b) is smaller than said first value of recognition index, selecting as a final learning sample data a sub-group which was defined in a preceding iteration and for which a corresponding value of recognition index was found to be at least equal to or greater than said first recognition index ($R_0$).

6. In a neural network learning procedure wherein successive learning data patterns, each data pattern formed of a fixed number of values, are supplied to a neural network having an input layer formed of the same number of units as said fixed number of values, wherein a neural network trained with an original set of learning sample data attains an original value of a recognition index, the improvement comprising a method of reducing an amount of learning sample data used to execute said learning procedure without affecting the recognition index attained by a neural network trained on the reduced learning sample data, including the steps of:

selecting from the original set of learning sample data a plurality of sub-groups of learning sample data;

successively judging respective values of recognition index attained by using respective sub-groups of said original set of learning sample data, said respective values obtained by using an arbitrary subset of test data extracted from said original learning sample data, and training a neural network using a sub-group of learning sample data judged to have a value of recognition index at least as high as said original value of recognition index attained by training with said original set of learning sample data.

7. The neural network learning procedure as recited in claim 6, wherein said step of training neural networks using a sub-group comprises training said neural networks without using said original set of learning sample data.

8. The neural network learning procedure as recited in claim 6, wherein said step of selecting comprises selecting from said original set of learning sample data a group of K sub-groups of learning sample data, where K is an integer greater than 1, and said step of successively judging comprises the steps of:
judging a value of recognition index of at least one of said K sub-groups of said original set of learning sample data;
upon judging that said at least one of said K sub-groups has a value of recognition index at least as high as said original value of recognition index, selecting from said original set of learning sample data a group of at least K+1 sub-groups of learning sample data, and judging a value of recognition index of at least one of said K+1 sub-groups of said original set of learning sample data.

9. The neural network learning procedure as recited in claim 8 wherein, upon judging that none of said K sub-groups has a value of recognition index at least as high as said original value of recognition index, using a specified sub-group of a previously selected group having at most K−1 sub-groups for training said neural networks, where said specified sub-group has been previously judged to have a value of recognition index at least as high as said original value of recognition index.

10. The neural network learning procedure as recited in claim 6, wherein said step of selecting comprises selecting from said original set of learning sample data K sub-groups of learning sample data, where K is an integer greater than 1, and said step of successively judging comprises the steps of:
judging a value of recognition index of one of said K sub-groups of said original set of learning sample data;
judging a value of recognition index of another one of said K sub-groups of said original set of learning sample data;
upon judging that at least one of said K sub-groups has a value of recognition index at least as high as said original value of recognition index, selecting from said original set of learning sample data at least K+1 sub-groups of learning sample data.

11. The neural network learning procedure as recited in claim 10 wherein, upon judging that none of said K sub-groups has a value of recognition index at least as high as said original value of recognition index, using a specified sub-group of a previously selected group having at most K−1 sub-groups for training said neural networks, where said specified sub-group has been previously judged to have a value of recognition index at least as high as said original value of recognition index.

* * * * *